(12) United States Patent
Bröcker et al.

(10) Patent No.: US 7,109,388 B2
(45) Date of Patent: Sep. 19, 2006

(54) PROCESS FOR THE PRODUCTION OF CATALYST PACKING, REACTOR CONTAINING CATALYST PACKING, AND THE USE THEREOF

(75) Inventors: Franz Josef Bröcker, Ludwigshafen (DE); Heinrich Laib, Ludwigshafen (DE); Gerd Rohrbacher, Ludwigshafen (DE); Ekkehard Schwab, Neustadt (DE); Helmut Jansen, Dormagen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1088 days.

(21) Appl. No.: 09/777,849

(22) Filed: Feb. 7, 2001

(65) Prior Publication Data

US 2001/0014764 A1 Aug. 16, 2001

(30) Foreign Application Priority Data

Feb. 9, 2000 (DE) ................ 100 05 663

(51) Int. Cl.
*C07C 5/03* (2006.01)
*B01J 35/02* (2006.01)
(52) U.S. Cl. .................... 585/260; 422/211
(58) Field of Classification Search .......... 428/36.1, 428/43, 98, 221, 357, 409; 502/527.2, 439; 585/260; 422/211
See application file for complete search history.

(56) References Cited

U.S. PATENT DOCUMENTS

| | | | |
|---|---|---|---|
| 3,450,506 A * | 6/1969 | Guerrieri | 422/197 |
| 4,215,011 A * | 7/1980 | Smith, Jr. | 422/211 |
| 4,271,044 A | 6/1981 | Fratzer | |
| 4,287,097 A | 9/1981 | Fratzer | |
| 4,324,701 A * | 4/1982 | Honda et al. | 502/100 |
| 4,363,753 A * | 12/1982 | Bozon et al. | 502/439 |
| 4,388,275 A | 6/1983 | Fratzer | |
| 4,471,014 A * | 9/1984 | den Hartog et al. | 428/182 |
| 4,696,910 A * | 9/1987 | Gustafsson et al. | 502/159 |
| 4,954,650 A * | 9/1990 | Abe et al. | 562/534 |
| 5,219,667 A * | 6/1993 | Hampton | 428/593 |
| 5,266,546 A * | 11/1993 | Hearn | 502/300 |
| 5,472,928 A * | 12/1995 | Scheuerman et al. | 502/305 |
| 5,491,258 A * | 2/1996 | Watanabe et al. | 562/538 |
| 5,628,925 A | 5/1997 | Domesle | |
| 5,866,734 A * | 2/1999 | Flick et al. | 585/260 |
| 5,985,112 A * | 11/1999 | Fischer | 204/283 |
| 6,297,415 B1 * | 10/2001 | Brocker et al. | 585/260 |
| 6,436,873 B1 * | 8/2002 | Brocker et al. | 502/439 |

FOREIGN PATENT DOCUMENTS

| | | |
|---|---|---|
| DE | 29 08 671 | 9/1980 |
| DE | 44 11 302 | 10/1995 |
| EP | 433 223 | 6/1991 |

* cited by examiner

*Primary Examiner*—Cam N. Nguyen
(74) *Attorney, Agent, or Firm*—Novak Druce & Quigg, LLP

(57) ABSTRACT

The invention relates to catalyst packing and a production process for catalyst packing in which a fabricated woven or knitted fabric in the form of continuous web goods is shaped to give a package by stacking a plurality of layers, and segments (S) are cut out of the package and assembled to give one or more course(s) which completely fill the reactor cross section. A reactor containing catalyst packing of this type is particularly suitable for catalytic reactions, preferably for hydrogenations, selective hydrogenations, selective oxidations or isomerizations.

16 Claims, 1 Drawing Sheet

PROCESS FOR THE PRODUCTION OF CATALYST PACKING, REACTOR CONTAINING CATALYST PACKING, AND THE USE THEREOF

FIELD OF THE INVENTION

The invention relates to catalyst packing, to a process for the production of catalyst packing, to a reactor containing catalyst packing, and to the use thereof.

BACKGROUND OF THE INVENTION

Catalyst packing is known for carrying out a wide variety of liquid-phase reactions and for cleaning the exhaust from internal-combustion engines and industrial plants.

Thus, DE-C-29 08 671 describes a catalyst support which is permeated by flow channels and has a cross-flow effect, comprising layers of a steel sieve fabric arranged one on top of the other with improved support profiles in the support matrix.

DE-C-44 11 302 describes a process for the production of a monolithic supported catalyst in the form of a coated gas-permeable molding. This catalyst packing likewise has flow channels in the starting-material flow direction.

EP-B-433 223 describes catalyst packing having a support structure comprising layers of steel sheeting or solid ceramic material stacked one on top of the other, where the layers are arranged in the principal flow direction and, owing to waved or zigzag-shaped profiling, form linear flow channels which are open to one another and cross one another. This catalyst packing thus also has flow channels in the starting-material flow direction.

The known catalyst packing is monolithic, structured packing which has flow directions in the starting-material flow direction. If reactions are to be carried out in the gas phase, in particular under superatmospheric pressures, this results, in known catalyst packing, in the formation of laminar flow and consequently slip of unreacted starting materials.

It is an object of the invention to provide catalyst packing which does not have the disadvantages described.

SUMMARY OF THE INVENTION

We have found that this object is achieved by catalyst packing for a reactor having one or more course(s) which completely fill the reactor cross section, comprising a plurality of stacked layers of a fabricated woven or knitted fabric in the form of continuous web goods, wherein the layers are arranged perpendicular to the principal flow direction in the reactor, and a course is formed from at least 3 segments.

The process object is achieved by a production process in which a continuous woven or knitted fabric in the form of continuous web goods is shaped by stacking a plurality of layers thereof to give a package, and segments are cut out of the package and assembled to give one or more course(s) which completely fill the reactor cross section.

The production process according to the invention ensures inexpensive, in particular time- and material-saving production and gives catalyst packing which has absolutely no preferential direction for the starting-material flow and thus facilitates improved reaction engineering, in particular with respect to the selectivity and catalyst service life.

In particular, it enables catalyst packing to be provided, in an economically advantageous manner, from continuous web goods with virtually no trimming waste and in particular with virtually no loss of expensive active component which has been applied in advance to the continuous web goods.

In addition, catalyst packing is provided which can be installed and removed in a simple manner, generally via manholes, in particular in large reactors having, if they are cylindrical, a diameter in the range from about 50 to 5000 mm, preferably from 1000 to 2500 mm.

BRIEF DESCRIPTION OF THE DRAWING

The invention will now be described in greater detail with reference to the following drawing figure wherein.

DETAILED DESCRIPTION OF THE INVENTION

Figure 1:
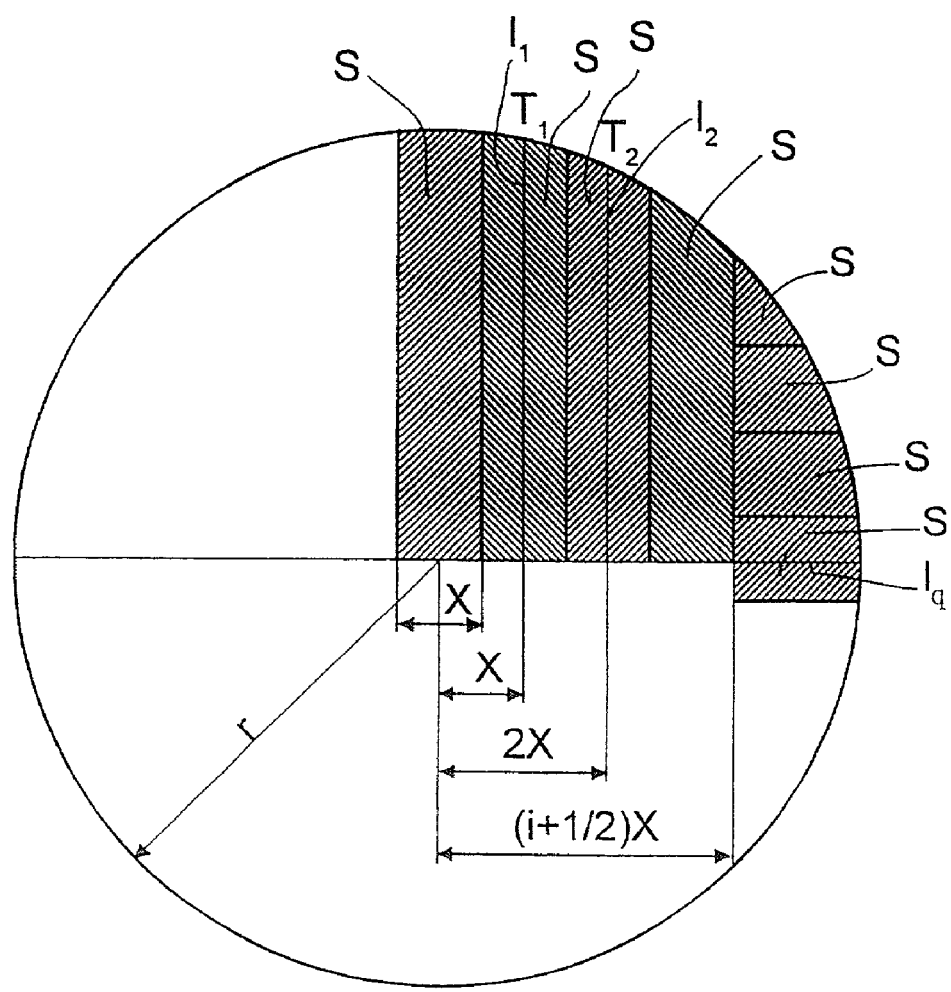
FIG. 1 is a diagrammatic cross section through a reactor having catalyst packing according to the invention, where, for the purpose of better clarity, only a quarter of a catalyst course which completely fills the reactor cross section is shown.

The catalyst packing according to the invention is produced starting from known catalyst supports in the form of a woven or knitted fabric available as continuous web goods. Particularly suitable support materials are metals, for example stainless steels, but also inorganic materials, such as ceramic, aluminum oxide and/or silicon dioxide, other asbestos substitutes, and also plastics, for example polyamides, polyesters, polyvinyls, polyethylene, polypropylene or polytetrafluoroethylene, or also carbon.

The active components are subsequently applied to the knitted or woven support fabric in a known manner, for example by the particularly suitable method described in EP-A-0 564 830, in which woven metal fabrics, preferably stainless steels, are firstly heated at temperatures of from 600 to 1100° C., preferably from 800 to 1000° C., for from one to 20 hours, preferably from one to 10 hours, in air and subsequently re-cooled. This crucial thermal pretreatment significantly improves the catalyst activity. The coating with active components is subsequently carried out at elevated temperature. To this end, the catalyst support is coated simultaneously or successively with the active components and promoters, batchwise or continuously, under a reduced pressure of from $10^{-3}$ to $10^{-8}$ mbar by means of an evaporation device, for example electron-beam evaporation or sputtering apparatus. This can be followed by heating under an inert gas.

The active components and promoters are selected appropriately, depending on the intended application. Particularly suitable for hydrogenation reactions are elements from group 8 of the Periodic Table, such as Fe, Co, Ni, Ru, Rh, Pd, Pt and Ir. Promoters which can be used or hydrogenation reactions include Cu, Ag, Au, Zn, Sn, Bi and Sb.

However, the process for the application of active components and promoters to the catalyst support is not restricted to vacuum coating. On the contrary, any process can basically be employed for this purpose. It is, for example, possible to apply the active components to the catalyst support by impregnation with solutions of the corresponding salts. Sol-gel impregnation is also possible. This is followed by drying and, if desired, calcination.

The coated woven or knitted fabric is available as continuous web goods, preferably with a width of from 50 to 500 mm, in particular from 100 to 300 mm.

For the purposes of the present invention, the term "continuous web goods" is taken to mean web goods which are theoretically continuous, but in practice have a handleable length, in the range from 10 to 2000 m, preferably from 50 to 300 m.

The continuous web goods are fabricated, i.e. shaped, in particular waved or crimped by means of toothed rollers.

The continuous web goods made from fabricated woven or knitted fabric are then arranged in stacked layers, forming a package, preferably with a thickness of from 40 to 400 mm, in particular from 100 to 250 mm. The stacking of the continuous web goods is preferably carried out by folding the theoretically continuous web goods, with the consequence that respective stacked layers in a package are rotated by 180° to one another.

The length of the package is in principle unlimited, but it is recommended that an easily handleable length be selected.

Segments are now cut out of the package and assembled to give one or more course(s) which completely fill the reactor cross section. The stacked layers of the continuous web goods are, in accordance with the invention, arranged perpendicular to the principal flow direction in the reactor, and a course is formed from at least 3 segments.

Catalyst packing of this type has absolutely no preferential direction for the reaction fluid and prevents or at least substantially reduces slip of unreacted starting materials.

The catalyst packing is preferably designed in such a way that segments (S) adjacent to one another in each case at their rectangular faces are arranged symmetrically to one another with respect to the rectangular face.

In a particularly suitable manner, the following sequence of cuts is used to separate the segments from the package:

a) a first segment with a length equal to twice the reactor radius or a first pair of segments with a length equal to the reactor radius for placing in the center of the reactor cross section is removed by rectangular cuts, b) two further pairs of segments each with length $2 \cdot l_1$, where $$l_1 = \sqrt{r^2 - x^2}.$$

where r=reactor internal radius and x=web width of the package, are removed by rectangular cuts and are subsequently divided into in each case two geometrically identical segments by an inclined cut along the tangents at the reactor interior circle at a point $T_l$ which is at a distance x from the longitudinal axis of the first segment, for placing on both sides of the first, central segment, and c) if desired, further pairs of segments are removed, in each case in double the number corresponding to the cut sequence in b), with a length $2 \cdot l_i$, where i=natural number, $i \geq 2$, where $$l_i = \sqrt{r^2 - i \cdot x^2}$$

and where the point $T_i$, at which the tangent to the reactor interior circle is placed is in each case at a distance of i times x from the longitudinal axis of the first, central segment, and d) in order to fill the two edge gaps, segments are removed from the package analogously to a), b) and c), hut for insertion rotated by an angle of 90° to the segments already inserted.

The cut sequence according to the invention is particularly inexpensive, in particular labor time- and material-saving.

In step b) and, if used, c), in each case groups of four segments which are geometrically identical to one another are in each case obtained and are inserted in a suitable manner into the reactor cross section in such a way that a course which completely fills the reactor cross section is obtained.

Since the segments are somewhat larger than the corresponding arcs, but can be inserted well into the reactor owing to the flexibility of the woven or knitted fabric, the reactor cross section is filled completely and any slip at the reactor wall is prevented. The good, direct contact of the catalyst course with the reactor wall additionally results in a significant improvement in heat transfer.

The analogous use of steps a), b) and c) for filling the edge gap in step d) is based on a first, largest length $2 \cdot l_q$, after which a first segment to be inserted in the center is then produced in a corresponding manner to step a) perpendicular to the first segment corresponding to step a).

In order to fill the two edge gaps, this segment must be halved. The length $l_q$ is calculated from the formula $$l_q = r - (i + \tfrac{1}{2}) \cdot x$$

where r, i and x are as defined above.

One or more grilles, in particular connected to one another and/or the reactor interior wall, for accommodating the course(s) are preferably arranged in the reactor. One or more, in particular 1 to 6, preferably 2 to 4, course(s) may be arranged on the grille. There are no restrictions here regarding the positioning of the courses in the reactor and/or with respect to one another. The courses may, in particular, be introduced at a basically unrestricted distance from one another, but alternatively with complete filling of the reactor.

The segments arranged one on top of the other in the reactor longitudinal direction in two successive courses are particularly preferably in each case arranged rotated with respect to one another, in particular rotated by an angle of 45°. The formation of flow channels in the starting-material flow direction is thus countered particularly well.

In particular, catalyst packing for a cylindrical reactor is provided in accordance with the invention, but it is in principle also possible to fit reactors having a non-circular cross section, for example cuboid reactors, correspondingly with catalyst packing.

The catalyst packing according to the invention is particularly suitable for carrying out catalytic reactions, preferably hydrogenations, selective hydrogenations, selective oxidations or isomerizations.

The invention is explained in greater detail below with reference to a drawing and an illustrative embodiment.

The single FIGURE shows diagrammatically a cross section through a reactor having catalyst packing according to the invention, where, for the purpose of better clarity, only a quarter of a catalyst course which completely fills the reactor cross section is shown. In the figure, r denotes the reactor internal radius, x denotes the web width of the woven or knitted fabric and thus the web width of the package, and of each segment, $l_1$ denotes the half length of the $2^{nd}$ segment pair, $l_2$ denotes the half length of the $3^{rd}$ segment pair, and $l_q$ denotes the half length of the segment to be inserted centrally into each of the two edge gaps.

$T_1$ and $T_2$ denote the points on the reactor interior circle at which the tangents for the cut sequence are to be placed.

Illustrative Embodiment:

A cylindrical hydrogenation reactor having a reactor internal diameter of 1400 mm and a volume of 4 m³ was filled completely with catalyst packing according to the invention. Each course consisted of 5 segments, and additionally of the two segments filling the edge gaps. The web width was 200 mm, and the height of the package was 110 mm. The reactor was employed for the selective hydrogenation of MAPD (methylacetylene and propadiene) in the propene stream of a steam cracker, at a space velocity of 30 metric tons of propene/h. The total run time was about 1 year. A selectivity of well above 95% and a tripling of the catalyst service life compared with a conventional hydrogenation reactor with a bed of catalyst moldings in bead form.

We claim:

1. A process for the production of catalyst packing for a reactor, the catalyst packing having one or more course(s) that completely fill the reactor cross section, and the catalyst packing comprising a plurality of stacked layers of fabricated woven or knitted fabric in the form of continuous web goods, wherein the layers are arranged perpendicular to the principal flow direction in the reactor, and a course is formed from at least three segments (S), which process comprises shaping a fabricated woven or knitted fabric which is in the form of continuous web goods by stacking a plurality of layers of said fabric one on top of the other to give a package, cutting segments (S) out of the package, and assembling the segments (S) to give one or more course(s) which completely fill the reactor cross section.

2. A process as claimed in claim 1, wherein respective stacked layers in a package are rotated by 180° to one another.

3. A process as claimed in claim 1, wherein the following sequence of cuts is used to separate the segments (S) from the package:

a) a first segment (S) with a length equal to twice the reactor radius or a first pair of segments with a length equal to the reactor radius for placing in the center of the reactor cross section is removed by rectangular cuts, b) two further pairs of segments each with length $2 \cdot l_1$, where $$l_1 = \sqrt{r^2 - x^2}$$

where r=reactor internal radius and x=web width of the package, are removed by rectangular cuts and are subsequently divided into in each case two geometrically identical segments (s) by an inclined cut along the tangents at the reactor interior circle at a point $T_1$ which is at a distance x from the longitudinal axis of the first segment (S), for placing on both sides of the first, central segment (S), and c) optionally further pairs of segments are removed, in each case in double the number corresponding to the cut sequence in b), with a length $2 \cdot l_i$, where i=natural number, $i \geq 2$, where $$l_i = \sqrt{r^2 - i \cdot x^2}$$

and where the point $T_i$ at which the tangent to the reactor interior circle is placed is in each case at a distance of i times x from the longitudinal axis of the first, central segment (S), and d) in order to fill the two edge gaps, segments (S) are removed from the package analogously to a), b) and c), but for insertion rotated by an angle of 90° to the segments (S) already inserted.

4. A process as claimed in claim 1, wherein continuous web goods having a width of from 50 to 500 mm are employed.

5. A process as claimed in claim 4, wherein the width of the continuous web goods is from 100 to 300 mm.

6. A process as claimed in claim 1, wherein a package having a thickness of from 40 to 400 mm is produced by stacking the continuous web goods.

7. A process as claimed in claim 6, wherein the thickness of the package is from 100 to 250 mm.

8. A process as claimed in claim 1, wherein one or more grille(s) is (are) arranged in the reactor for accommodating the course(s).

9. A process as claimed in claim 8, wherein from 1 to 6 course(s) is (are) arranged on a grille.

10. A process as claimed in claim 9, wherein from 2 to 4 courses are arranged on a grille.

11. A process as claimed in claim 8, wherein the grilles are connected to one another and/or to the reactor internal wall.

12. A process as claimed in claim 1, wherein the segments (S) arranged one on top of the other in the reactor longitudinal direction in two successive courses are in each case arranged rotated with respect to one another.

13. A process as claimed in claim 12, wherein the segments (S) are in each case arranged rotated with respect to one another by an angle of 45°.

14. The process of claim 1 wherein each of the segments (S) has at least one rectangular face and segments (S) which are arranged adjacent to one another in each case at their rectangular faces are arranged symmetrically to one another with regard to the rectangular face.

15. A method of conducting a catalytic reaction which comprises providing the catalyst packing produced as claimed in claim 1 and arranging the catalyst packing in a reactor for catalytic reactions.

16. The method of claim 15, wherein the catalytic reaction is a hydrogenation, a selective hydrogenation, a selective oxidation or an isomerization reaction.

* * * * *